US012463914B2

(12) United States Patent
Östberg et al.

(10) Patent No.: US 12,463,914 B2
(45) Date of Patent: Nov. 4, 2025

(54) ACCOMMODATION OF LATENCY VARIATIONS OF A COMMUNICATION NETWORK

(71) Applicant: Telefonaktiebolaget LM Ericsson (publ), Stockholm (SE)

(72) Inventors: Christer Östberg, Staffanstorp (SE); Emma Wittenmark, Lund (SE); Johan Strand, Staffanstorp (SE); Kjell Gustafsson, Lund (SE); Torbjörn Sölve, Malmö (SE); Henrik Ronkainen, Södra Sandby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 191 days.

(21) Appl. No.: 18/012,035

(22) PCT Filed: Jul. 1, 2020

(86) PCT No.: PCT/EP2020/068578
§ 371 (c)(1),
(2) Date: Dec. 21, 2022

(87) PCT Pub. No.: WO2022/002394
PCT Pub. Date: Jan. 6, 2022

(65) Prior Publication Data
US 2023/0275842 A1 Aug. 31, 2023

(51) Int. Cl.
*H04L 47/283* (2022.01)
*H04L 47/263* (2022.01)
(52) U.S. Cl.
CPC .......... *H04L 47/283* (2013.01); *H04L 47/263* (2013.01)
(58) Field of Classification Search
None
See application file for complete search history.

(56) References Cited

U.S. PATENT DOCUMENTS

| 9,271,212 | B1 | 2/2016 | Pei |
| 10,592,578 | B1* | 3/2020 | Mokashi ............... H04N 21/25 |
| 11,228,516 | B1* | 1/2022 | Harwani ............... H04L 67/10 |
| 11,659,444 | B1* | 5/2023 | Xing .................... H04W 24/02 |
| | | | 370/235 |
| 2006/0135074 | A1 | 6/2006 | Petrovic et al. |
| 2010/0039938 | A1 | 2/2010 | Sagfors |

(Continued)

FOREIGN PATENT DOCUMENTS

GB 2399989 A 9/2004
WO WO 2019/240770 A1 12/2019

OTHER PUBLICATIONS

Spreadtrum Communications, "Handling of collision involving measurement gap," 3GPP TSG-RAN WG2 Meeting #110 electronic, R2-2005051, Online, Jun. 1-12, 2020, 3 pages.

(Continued)

*Primary Examiner* — Eunsook Choi
(74) *Attorney, Agent, or Firm* — Sage Patent Group

(57) ABSTRACT

A method for accommodation of latency variation in a communication network is disclosed. The method comprises identifying that a service is currently associated with a user device associated with the communication network, wherein a deviation between a latency requirement of the service and an internal latency performance of the communication network is bounded, predicting an upcoming reduction of communication network throughput for the user device, and providing a rate adaptor associated with the service with a feedback indication in response to predicting the reduction of communication network throughput, wherein the feedback indication is for rate reduction of the service.

In some embodiments, the prediction and provision are performed only for user devices associated with services with bounded deviation between the latency requirement of the service and the internal latency performance of the communication network.

19 Claims, 3 Drawing Sheets

(56) References Cited

U.S. PATENT DOCUMENTS

| | | |
|---|---|---|
| 2011/0044262 A1 | 2/2011 | Satapathy et al. |
| 2011/0159801 A1 | 6/2011 | Maltsev et al. |
| 2011/0199934 A1 | 8/2011 | Olofsson et al. |
| 2012/0069756 A1 | 3/2012 | Ji et al. |
| 2012/0115541 A1 | 5/2012 | Suga et al. |
| 2012/0238272 A1 | 9/2012 | Hwang et al. |
| 2013/0065632 A1 | 3/2013 | Macias et al. |
| 2013/0223222 A1 | 8/2013 | Kotecha et al. |
| 2014/0355428 A1 | 12/2014 | Smith et al. |
| 2015/0310234 A1 | 10/2015 | Janssens |
| 2015/0341411 A1 | 11/2015 | Huber et al. |
| 2015/0341832 A1 | 11/2015 | Hwang et al. |
| 2016/0127954 A1 | 5/2016 | Zhou |
| 2016/0156520 A1 | 6/2016 | Scully et al. |
| 2016/0212674 A1 | 7/2016 | Nakamura et al. |
| 2016/0234078 A1 | 8/2016 | Jana et al. |
| 2016/0302128 A1 | 10/2016 | Anchan |
| 2018/0115392 A1 | 4/2018 | Yang et al. |
| 2018/0242191 A1 | 8/2018 | Lundqvist et al. |
| 2018/0288641 A1 | 10/2018 | Mildh et al. |
| 2019/0014050 A1 | 1/2019 | Wang et al. |
| 2019/0158371 A1 | 5/2019 | Dillon et al. |
| 2019/0254088 A1 | 8/2019 | Park et al. |
| 2019/0313317 A1 | 10/2019 | Murphy |
| 2020/0015121 A1* | 1/2020 | Misra ................... H04L 65/752 |
| 2020/0053018 A1* | 2/2020 | White ................ H04L 47/6275 |
| 2020/0084142 A1* | 3/2020 | Bochkar .............. H04L 47/125 |
| 2020/0120036 A1* | 4/2020 | Zhou ....................... H04L 12/56 |
| 2020/0170052 A1 | 5/2020 | Yang et al. |
| 2020/0195539 A1 | 6/2020 | Sivaraj et al. |
| 2020/0296632 A1 | 9/2020 | Pudukoli Subrahmanya et al. |
| 2020/0336945 A1 | 10/2020 | Gapin et al. |
| 2020/0396713 A1 | 12/2020 | Anada et al. |
| 2021/0037544 A1 | 2/2021 | Andrews et al. |
| 2021/0112006 A1* | 4/2021 | Francini ................ H04L 47/115 |
| 2022/0417166 A1* | 12/2022 | Sivaraj ................... H04L 47/27 |

OTHER PUBLICATIONS

International Search Report and Written Opinion of the International Searching Authority, PCT/EP2020/068581, mailed Mar. 30, 2021, 12 pages.

International Search Report and Written Opinion of the International Searching Authority, PCT/EP2020/068582, mailed Mar. 29, 2021, 11 pages.

International Search Report and Written Opinion of the International Searching Authority, PCT/EP2020/068577, mailed Mar. 24, 2021, 13 pages.

International Search Report and Written Opinion of the International Searching Authority, PCT/EP2020/068578, mailed Mar. 15, 2021, 9 pages.

International Search Report and Written Opinion of the International Searching Authority, PCT/EP2020/068580, mailed Mar. 24, 2021, 18 pages.

3GPP TSG-RAN WG2 #103-bis, Tdoc R2-1912357, Chongqing, China, Oct. 14-18, 2019, Agenda Item 7.3.2.1.1, Ericsson, "Handover Interruption Reduction for UM Bearers," (XP051803851) 4 pages.

Kumar, R., et al., "Design Of An Enhanced Bearer Buffer for Latency Minimization in the Mobile RAN," 2019 IEEE Global Communications Conference (BLOBECOM) Dec. 9, 2019 (XP033722312) 6 pages.

De Schepper, K., et al., Identifying Modified Explicit Congestion Notification (ECN) Semantics for Ultra-Low Queuing Delay (L4S) Mar. 9, 2020 (XP015138622) 45 pages.

Briscoe, B., Ed., et al., "Low Latency, Low Loss, Scalable Throughput (L4S) Internet Service: Architecture," Transport Area Working Group, Internet Draft, draft-ietf-tsvwg-l4s-arch-06, Mar. 9, 2020, 29 pages.

Le Boudec, J-Y, "Rate adaptation, Congestion Control and Fairness: A Tutorial," Ecole Polytechnique Federale de Lausanne (EPFL), Sep. 12, 2014, 45 pages.

Molisch, A., "Wireless Communications," Wireless Communications, Second Edition, © 2011 John Wiley & Sons Ltd., 884 pages.

International Search Report and Written Opinion of the International Searching Authority, PCT/EP2020/080818, mailed Aug. 20, 2021, 10 pages.

United States Office Action, United States U.S. Appl. No. 18/033,646, mailed Jun. 30, 2025, 15 pages.

United States Office Action, U.S. Appl. No. 18/033,646, mailed Jun. 30, 2025, 14 pages.

United States Office Action, U.S. Appl. No. 18/011,984, mailed Aug. 21, 2025, 45 pages.

United States Office Action, United States U.S. Appl. No. 18/033,646, mailed Jun. 30, 2025. 45 pages.

* cited by examiner

ACCOMMODATION OF LATENCY VARIATIONS OF A COMMUNICATION NETWORK

CROSS REFERENCE TO RELATED APPLICATIONS

This application is a 35 U.S.C. § 371 national stage application of PCT International Application No. PCT/EP2020/068578 filed on Jul. 1, 2020, the disclosure and content of which is incorporated by reference herein in its entirety.

TECHNICAL FIELD

The present disclosure relates generally to the field of wireless communication. More particularly, it relates to accommodation of latency in wireless communication scenarios.

BACKGROUND

Different forms of latency control are generally applied in wireless communication scenarios. In some situations, existing approaches for latency control do not provide for desirable performance.

Therefore, there is a need for alternative approaches for latency management.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for accommodation of latency variation in a communication network. The method comprises identifying that a service is currently associated with a user device associated with the communication network, wherein a deviation between a latency requirement of the service and an internal latency performance of the communication network is bounded, predicting an upcoming reduction of communication network throughput for the user device, and providing a rate adaptor associated with the service with a feedback indication in response to predicting the reduction of communication network throughput, wherein the feedback indication is for rate reduction of the service.

In some embodiments, the prediction and provision are performed only for user devices associated with services with bounded deviation between the latency requirement of the service and the internal latency performance of the communication network.

In some embodiments, predicting the upcoming reduction of communication network throughput for the user device comprises predicting that a future communication network throughput value for the user device is lower than a throughput threshold value.

In some embodiments, predicting the upcoming reduction of communication network throughput for the user device comprises determining that a probability for upcoming reduction of communication network throughput for the user device is larger than a reduction probability threshold value.

In some embodiments, predicting the upcoming reduction of communication network throughput for the user device comprises predicting the upcoming reduction of communication network throughput in an upcoming time window.

In some embodiments, a start time of the upcoming time window and/or a length of the upcoming time window is based on one or more of: an expected duration of the communication network throughput reduction, a maximum acceptable latency of the latency sensitive service, and a reaction speed of the rate adaptor.

In some embodiments, the method further comprises configuring the rate adaptor to apply an adjusted gradient for rate increase which is larger than a default gradient for rate increase.

In some embodiments, the rate adaptor is configured to apply the adjusted gradient for rate increase after a period with decreased rate caused by the feedback indication.

In some embodiments, the rate adaptor applies a low latency low loss scalable throughput (L4S) algorithm, and providing the feedback indication comprises setting explicit congestion notification (ECN) bits.

In some embodiments, predicting the upcoming reduction of communication network throughput for the user device is based on one or more cell-specific prediction criteria and/or on one or more network-general prediction criteria.

In some embodiments, predicting the upcoming reduction of communication network throughput for the user device is based on one or more of: a capability category of the user device, a subscription type of the user device, an original equipment manufacturer (OEM) of the user device, a current time indication, a current and/or previous location of the user device, a current and/or previous signal quality of the user device, a current and/or previous communication network throughput of the user device, a current and/or previous timing advance (TA) of the user device, and a load of a serving cell and/or a target cell.

In some embodiments, predicting the upcoming reduction of communication network throughput for the user device is based on communication network throughput statistics.

In some embodiments, identifying that a service is currently associated with a user device, wherein the deviation between the latency requirement of the service and the internal latency performance of the communication network is bounded, comprises one or more of: detecting that a service class identifier is indicative of the service, detecting that a bearer dedicated for low latency requirements is assigned for the service, and determining that a traffic pattern of the service matches a latency sensitive traffic pattern.

In some embodiments, the bounded deviation between the latency requirement of the service and the internal latency performance of the communication network comprises one or more of: a ratio between a latency requirement parameter value of the service and an internal latency performance parameter value of the communication network not exceeding a bounding threshold, a latency requirement parameter value of the service and an internal latency performance parameter value of the communication network being in a same order of magnitude, a latency requirement parameter value of the service and an internal latency performance parameter value of the communication network being equal, and a required end-to-end round-trip-time of the service falling within a time range specified relative an internal round-trip-time of the communication network.

In some embodiments, the service has a maximum allowable latency which is lower than that of mobile broadband (MBB) services and/or higher than that of ultra-reliable low latency communication (URLLC) services.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for accommodation of latency variation in a communication network. The apparatus comprises controlling circuitry configured to cause identification that a service is currently associated with a user device associated with the communication network, wherein a deviation between a latency requirement of the service and an internal latency performance of the communication network is bounded, prediction of an upcoming reduction of communication network throughput for the user device, and provision to a rate adaptor associated with the service of a feedback indication in response to predicting the upcoming reduction of communication network throughput, wherein the feedback indication is for rate reduction of the service.

A fourth aspect is a network node comprising the apparatus of the third aspect.

In some embodiments, any of the above aspects may additionally have features identical with or corresponding to any of the various features as explained above for any of the other aspects.

An advantage of some embodiments is that alternative approaches for latency management are provided. Generally, the alternative approaches for latency management may be used instead of, or together with, other approaches for latency control, as suitable.

An advantage of some embodiments is that accommodation of latency variations of a communication network is enabled, under the constraint of latency requirements on communication between end points of a service.

An advantage of some embodiments is that efficient rate adaption is enabled.

An advantage of some embodiments is that robust rate adaption is enabled.

An advantage of some embodiments is that a rate adaptor is enabled to apply proactive rate reduction (e.g., before a congestion has occurred).

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Figure 1:
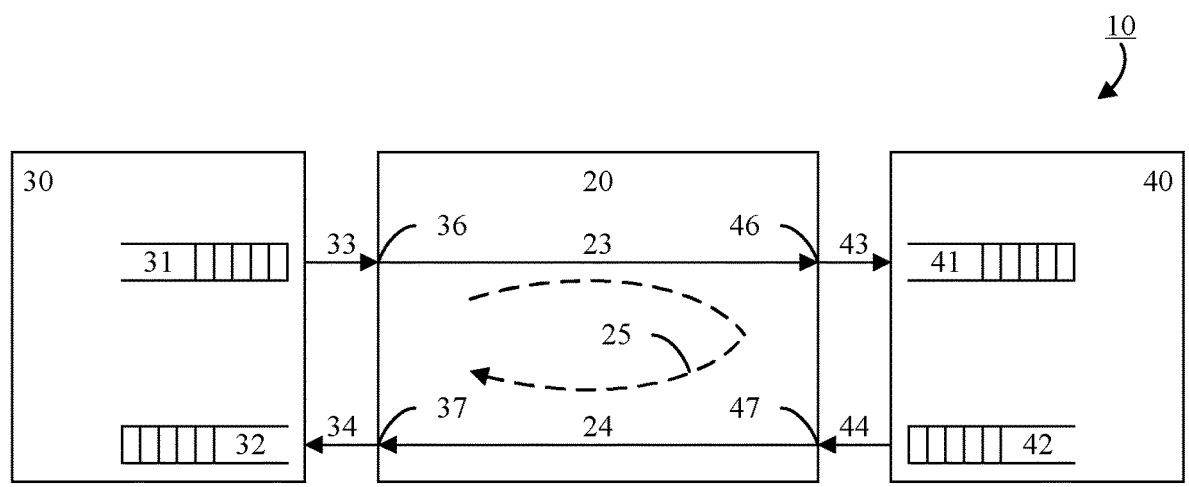
FIG. 1 is a schematic block diagram illustrates an example communication scenario according to some embodiments.

As mentioned before, different forms of latency control are generally applied in wireless communication scenarios. FIG. 1 schematically illustrates a communication scenario 10 for demonstrating a type of situation where latency control may be challenging.

The communication scenario 10 comprises two communication end points 30, 40 and a communication network 20. The communication network 20 is for carrying information (e.g., data and/or control information) from end point 30 to end point 40 as illustrated by 33, 23, and 43 and/or from end point 40 to end point 30 as illustrated by 44, 24, and 34.

The end points 30, 40 may be any suitable communication end points. One example of a communication end point pair is an application client-server pair.

Depending on the type of service the end points 30, 40 are engaged in, there may be different latency requirements on the communication between the end points 30, 40.

Generally, latency of communication between the end points 30, 40 may be defined as one or more of: a time for transfer of information from end point 30 to end point 40 (possibly defined as a time between information entering a transmission buffer 31 associated with the end point 30 and the same information being dispatched from a reception buffer 41 associated with the end point 40), a time for transfer of information from end point 40 to end point 30 (possibly defined as a time between information entering a transmission buffer 42 associated with the end point 40 and the same information being dispatched from a reception buffer 32 associated with the end point 30), a time from issuing of first information at end point 30 (possibly defined as a time when the first information enters a transmission buffer 31 associated with the end point 30) to reception of second information at end point 30 (possibly defined as a time when the second information is dispatched from a reception buffer 32 associated with the end point 30) wherein the second information is issued by end point 40 in response to reception of the first information, and a time from issuing of first information at end point 40 (possibly defined as a time when the first information enters a transmission buffer 42 associated with the end point 40) to reception of second information at end point 40 (possibly defined as a time when the second information is dispatched from a reception buffer 41 associated with the end point 40) wherein the second information is issued by end point 30 in response to reception of the first information.

Alternatively or additionally, and generally, latency of communication between end points may be characterized by one or more of: an average duration of end point to end point transfer, a minimum duration of end point to end point transfer, a maximum duration of end point to end point transfer, a variance of the duration of end point to end point transfer, and a probability that duration of end point to end point transfer exceeds a duration threshold.

Generally, end point to end point transfer may refer to a one way transfer or to a round-trip-time (RTT).

The latency requirements on the communication between the end points may be defined according to any of the above, or other suitable, definitions and characterization. For example, a specific service may require that the time from issuing of first information at end point 30 to reception of second information at end point 30 (wherein the second information is issued by end point 40 in response to reception of the first information) is below a maximum duration value and/or has a variance below a maximum variance value.

The communication network 20 may be any suitable communication network. One example of a communication network is any wireless communication network operating in accordance with a standard advocated by the third generation partnership project (3GPP); e.g., the universal mobile telecommunication system (UMTS), UMTS long term evolution (LTE), or a fifth generation (5G) system. The communication network may, for example, comprise a radio access network (RAN) and/or a core network (CN).

The communication network 20 typically has an internal latency performance, schematically illustrated by 25.

The internal latency performance 25 of the communication network 20 determines (e.g., limits) how quickly information delivered to the communication network at 36 can be transferred through the communication network over 23 and provided at 46 and/or how quickly information delivered to the communication network at 47 can be transferred through the communication network over 24 and provided at 37.

The internal latency performance 25 of the communication network 20 may be characterized in terms of the duration (delay) of the transfer over 23 and/or 24. For example, the internal latency performance 25 of the communication network 20 may be characterized by one or more of: an average duration of transfer through the communication network, a minimum duration of transfer through the communication network, a maximum duration of transfer through the communication network, a variance of the duration of transfer through the communication network, and a probability that duration of transfer through the communication network exceeds a duration threshold.

Generally, transfer through the communication network may refer to a one way transfer or to a round-trip-time (RTT).

The internal latency performance 25 of the communication network 20 may be caused by one or more of various (standardized or non-standardized) settings and limitations of the communication network. Some example settings and limitations of a communication network that inherently introduce latency include—but are not limited to—standardized time domain dimensions of communication resources (e.g., time duration of one or more units for communication), scheduling principles, protocols (e.g., retransmission protocols such as hybrid automatic repeat request-HARQ), and response requirements (e.g., for acknowledgement-ACK).

When the latency requirements on the communication between the end points are easily accommodated by the internal latency performance of the communication network, the end-to-end communication scenario is unproblematic from a latency perspective.

Such situations may, for example, occur when an average duration of transfer through the communication network is much lower than a required average duration of end point to end point transfer, when a maximum duration of transfer through the communication network is much lower than a required maximum (or average) duration of end point to end point transfer, and/or when a variance of duration of transfer through the communication network is much lower than a required maximum variance of duration of end point to end point transfer.

When the latency requirements on the communication between the end points are impossible to fully accommodate by the internal latency performance of the communication network, the end-to-end communication scenario is infeasible from a latency perspective.

Such situations may, for example, occur when an average duration of transfer through the communication network is much higher than a required average duration of end point to end point transfer, when a minimum duration of transfer through the communication network is higher than a required minimum (or average) duration of end point to end point transfer, and/or when a variance of duration of transfer through the communication network is higher than a required maximum variance of duration of end point to end point transfer.

These problems may be solved by application of a different communication network, or a specifically designed communication type within the communication network, to accommodate the latency requirements on the communication between the end points.

Embodiments presented herein are particularly applicable in situations which are neither of the above, i.e., situations when the latency requirements on the communication between the end points are not impossible, but not easy either, to accommodate by the internal latency performance of the communication network. Then, the end-to-end communication scenario is feasible, but problematic (e.g., presenting challenges), from a latency perspective. This may be seen as the end-to-end communication scenario comprising a service which is latency sensitive (i.e., with latency requirements on the communication between the end points) in relation to the internal latency performance of the communication network (i.e., latency sensitive service).

Such situations may, for example, occur when an average duration of transfer through the communication network is similar to a required average duration of end point to end point transfer, when a maximum duration of transfer through the communication network is similar to a required maximum duration of end point to end point transfer, and/or when a variance of duration of transfer through the communication network is similar to a required maximum variance of duration of end point to end point transfer.

Generally, a latency sensitive service associated with a user of a communication network may be defined as a service with latency requirements on the communication between the end points which are similar to the internal latency performance of the communication network.

For example, a latency sensitive service associated with a user of a communication network may be defined as a service with one or more latency requirement parameter value (e.g., average duration of transfer, maximum duration of transfer, variance of transfer duration, etc.) for the communication between the end points being in the same order of magnitude as the value of a corresponding parameter of the internal latency performance of the communication network.

Alternatively or additionally, a latency sensitive service associated with a user of a communication network may be defined as a service with one or more latency requirement parameter value (e.g., average duration of transfer, maximum duration of transfer, variance of transfer duration, etc.) for the communication between the end points deviating from the value of a corresponding, or otherwise relevant, parameter of the internal latency performance of the communication network by less than a threshold value.

Alternatively or additionally, a latency sensitive service associated with a user of a communication network may be defined as a service with a requirement of maximum duration of transfer for the communication between the end points which is lower than a maximum duration of transfer through the communication network.

Alternatively or additionally, a latency sensitive service associated with a user of a communication network may be defined as a service with a requirement of average duration of transfer for the communication between the end points deviates from an average duration of transfer through the communication network by less than a threshold value.

Alternatively or additionally, a latency sensitive service associated with a user of a communication network may be defined as a service with a requirement of variance of duration of transfer for the communication between the end points which is lower than a value based on a variance of duration of transfer through the communication network (e.g., lower than the variance of duration of transfer through the communication network, or lower than the variance of duration of transfer through the communication network plus or minus a bias value).

The problems associated with latency sensitive services may be solved in the same way as situations where the end-to-end communication scenario is infeasible from a latency perspective, i.e., by application of a different communication network, or a specifically designed communication type within the communication network, to more easily accommodate the latency requirements on the communication between the end points. However, application of a communication network (or a specifically designed communication type within a communication network) which accommodates strict latency requirements on the communication between the end points is typically inefficient in terms of throughput and/or capacity. For example, increasing the amount of allocated communication resources is one approach that is helpful to accommodate strict latency requirements on the communication between the end points, but has a negative impact on overall throughput of the communication network.

Therefore, there is a need for alternative approaches for latency management, which preferably address the problems associated with latency sensitive services (i.e., services with a sensitive relationship between latency requirements on the communication between the end points and the internal latency performance of the communication network).

A more detailed context will now be described, in relation to which embodiments may be particularly applicable. It should be noted that the following context is merely an illustrative example and not to be construed as limiting.

Some typical existing wireless communication networks (e.g., 3GPP-based networks supporting fourth generation, 4G, and earlier releases of the communication standard) are mainly optimized for mobile broadband (MBB) services and voice services. Generally, MBB traffic is not particularly latency sensitive but can be very throughput demanding. For example, for streaming services latency is typically handled by using large buffers which will efficiently hide latency jitter caused by latency events in the communication network, and thereby provide good end user experience. This exemplifies situations when the latency requirements on the communication between the end points are easily accommodated by the internal latency performance of the communication network, and the end-to-end communication scenario is unproblematic from a latency perspective.

In later releases of 4G, and especially in 5G, services of other types than MBB and voice have come into focus. One example is ultra-reliable low latency communication (URLLC) services. URLLC may be particularly suitable for industrial applications. Within 3GPP standardization, features are developed to support these new URLLC services and use cases. This exemplifies situations when the latency requirements on the communication between the end points are impossible to fully accommodate by the internal latency performance of the communication network, the end-to-end communication scenario is infeasible from a latency perspective, and a specifically designed communication type within the communication network is applied to accommodate the latency requirements on the communication between the end points.

Embodiments presented herein are particularly applicable in situations which are neither of the above (MBB, voice, and URLLC), i.e., situations when the latency requirements on the communication between the end points are not impossible, but not easy either, to accommodate by the internal latency performance of the communication network (referred to herein as latency sensitive services). In some embodiments, a relatively high throughput is also required (which is typically not the case for services requiring a specifically designed communication type, e.g., URLLC).

Some typical example services where embodiments may be particularly applicable—e.g., in the context of a 3GPP-based communication network—are gaming applications (gaming with or without rendering, and including multi-user gaming), augmented reality (AR), virtual reality (VR), and tele-operated vehicle control (e.g., driving).

Generally, the latency through the radio network (RAN), the core network (CN), and all the way to the communication end points (e.g., application client and application server) needs to be considered in view of latency requirements on the communication between the end points. One approach to reduce the impact of CN latency and/or of latency between the communication network and the application server, is to apply an edge cloud deployment of the application.

For situations when the latency requirements on the communication between the end points are not impossible, but not easy either, to accommodate by the internal latency performance of the communication network, some example latency requirements include a maximum round-trip-time (RTT) for communication between end points (end-to-end, E2E, RTT) in any of the ranges 10-100 ms, 30-100 ms, 30-50 ms, and 80-100 ms, and/or some example throughput requirements include a throughput in the range 5-10 Mbps or there over; up to 400 Mbps (e.g., for VR streaming applications).

For situations when the latency requirements on the communication between the end points are not impossible, but not easy either, to accommodate by the internal latency performance of the communication network, it may be further beneficial to consider reliability of the communication (e.g., measured as the probability of delivering traffic within a specified time duration, i.e., fulfilling the latency requirement). The reliability is tightly coupled with the latency requirements (without any latency requirement, the traffic can always be delivered, e.g., by using sufficiently many retransmissions). Thus, reliability is a relevant metric when a communication network is tuned for latency sensitive traffic.

Thus, some communication networks are typically dimensioned and configured to provide services (e.g., for MBB traffic) with high throughput and relatively relaxed latency requirements. Although latency is typically considered in such communication networks (e.g., in relation to transmission control protocol, TCP, throughput and ramp-up times), predictable latency (i.e., low latency variance) is typically not required. One explanation to the latter is that the timing requirements in some human-machine interaction (e.g., web-browsing and video streaming) is quite relaxed and rather large latency variations can be hidden with buffers.

For latency sensitive services, however, extensive use of buffers is not possible due to the nature of the applications (e.g., quick reaction times required for gaming, fast control response required for vehicle tele-operation, etc.). Typically, a latency spike will have negative impact on the application experience/performance for latency sensitive services. Some example events in a communication network that may cause latency spikes include handovers, slow fading dips, and fast fading dips.

In association with some typical communication networks (e.g., 3GPP-based networks for 4G and 5G), efforts are made to reduce overall latency (e.g., reducing the average latency). This, however, does not exclude a relatively large maximum latency and/or a relatively large latency variation (which may result in latency spikes, for example).

Regarding handover, some typical communication networks (e.g., 3GPP-based networks for 4G and 5G) apply a handover mechanism where service by one cell is released before service setup towards a target cell is completed. This mechanism causes a brief communication interruption during the handover procedure. The interruption may, for example, be in the range 30-60 ms, or considerably longer (e.g., up to 100 ms, or up to several hundreds of ms, such as 200 ms, 500 ms, or 900 ms).

For MBB services and voice services, these handover interruptions typically do not negatively affect the quality of the services, since the latency caused by the interrupt can be hidden with buffer management. For latency sensitive services, however, the length of these handover interruptions may be in the same order of magnitude as the latency requirements of the service, and a handover can negatively affect the quality of the service.

Hence, some approaches for latency control may comprise avoiding unnecessary handovers, at least for latency sensitive services, while performing handovers that are necessary to maintain connection between the communication network and a device operating at the communication end point.

Alternatively or additionally, some approaches for latency control may comprise controlling the setting of one or more network configuration parameter, at least for latency sensitive services.

Generally, there are many network configuration parameters that potentially impact the latency of a communication network. Examples include: the scheduling request periodicity (for UE initiated transmissions), the coding and modulation selected for HARQ retransmissions, the maximum number of HARQ retransmissions, timer settings in medium access control (MAC), timer settings in radio link control (RLC).

For MBB services and voice services, the setting of these configuration parameters typically have negligible impact on the user experience, since any un-acceptable latency jitter can be hidden with buffer management. For latency sensitive services, however, the setting of these configuration parameters can have a negative effect on the user experience since they might affect the variation in latency and/or the maximum latency.

Hence, some approaches for latency control may comprise controlling the setting of one or more network configuration parameter, at least for latency sensitive services, to provide latencies which are predictable (i.e., low variation in latency) and relatively low (i.e., low maximum latency).

Generally, some approaches for latency control may comprise keeping latency predictable and relatively low (bounded and predictable), while (preferably) enabling maintenance of the communication connection through the communication network at a predictable throughput. Thereby, latency sensitive services can be satisfactorily supported in the communication network.

Alternatively or additionally, some approaches for latency control may comprise, at least for latency sensitive services, informing the application about current and/or future conditions of the communication network that impact throughput and/or latency.

For example, when the application receives information that the throughput of the communication network throughput is decreasing, or predicted to decrease in a near future, the application can adapt to this situation. Example adaptions by the application include lowering of a data rate (e.g., by lowering an encoder rate, such as a video encoding rate).

Some communication networks already have approaches for differentiating services in RAN, which may be used for differentiation also in relation to latency sensitive services as defined herein. In some embodiments, such approaches may be combined with the alternative approaches for latency control presented herein.

Examples of already existing approaches for differentiating services in RAN include slicing, dedicated bearers, resource assignment differentiation, scheduling prioritization, etc. For example, some legacy solutions allow an operator to assign more or less resources and/or set a priority for a bearer that transport a specific service type (e.g., voice over LTE, VOLTE). Such approaches may comprise assigning different service class identifiers (e.g., quality-of-service class identifier—QCI, 5QI, etc.) to different bearers based on which type of service is carried by the bearer. Alternatively or additionally, some legacy solutions allow an operator to enable different types of services based on which type of subscription is associated with a user device.

Figure 2:
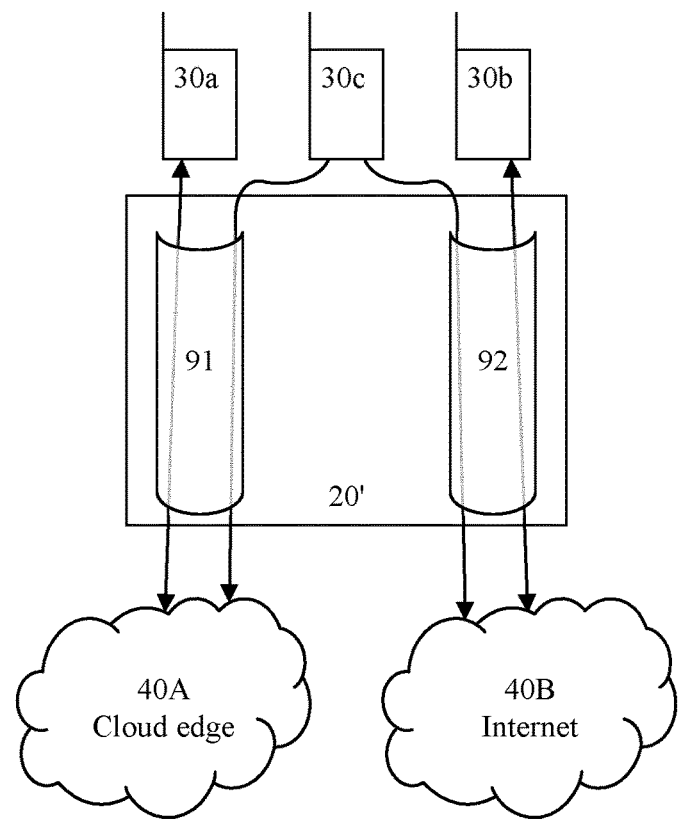
FIG. 2 is a schematic block diagram illustrates an example communication scenario according to some embodiments.

FIG. 2 schematically illustrates a communication scenario with differentiated bearers. The user device 30*a* communicates with an application dwelling in the Internet 40A via the communication network 20', using a bearer 91. The user device 30*b* communicates with an application associated with a latency sensitive service via the communication network 20', using another bearer 92. To reduce end-to-end latency, the application dwells in a cloud edge 40B. The user device 30*c* communicates with an application dwelling in the Internet 40A using the bearer 91, as well as with an application associated with a latency sensitive service dwelling in the cloud edge 40B using the bearer 92.

The different bearers 91, 92 may be differentiated to provide different latency characteristics as exemplified above, using any suitable latency approach (e.g., any of the alternative approaches for latency control described herein).

As mentioned above, alternative approaches for latency control are provided by this disclosure. Some embodiments of the approaches for latency control address the problems associated with latency sensitive services (i.e., services with a sensitive relationship between latency requirements on the communication between the end points and the internal latency performance of the communication network).

A possible principle for alternative approaches for latency control is to improve the internal latency performance of the communication network (e.g., decreasing the maximum duration of transfer through the communication network, and/or decreasing the average duration of transfer through the communication network, and/or decreasing the variance of duration of transfer through the communication network, etc.). This may, for example, be achieved by avoiding unnecessary handovers and/or by controlling the setting of one or more network configuration parameter.

Another possible principle for alternative approaches for latency control is to dynamically vary the utilization of the communication network by the service in view of the latency requirements on the communication between the end points. For example, temporarily (when the internal latency performance of the communication network is poor) lowering a communication rate that the service applies in the communication network may temporarily improve the internal latency performance of the communication network (e.g., due to less HARQ retransmissions, etc.) at the cost of reduced throughput. The latter may be mitigated by temporary buffer build-up (compare e.g., with 31 and 42 of FIG. 1) within the boundaries set by latency requirements on the communication between the end points. This may, for example, be achieved by informing the application about current and/or future conditions of the communication network to allow the application to adjust its data rate.

The above possible principles may be used alone or in combination.

In some embodiments, the above possible principles are used exclusively for latency sensitive services, or only for communication end points associated with a latency sensitive service.

In the following, embodiments will be described where alternative approaches for latency control are provided. Some embodiments are particularly suitable for latency control in situations as that described in connection with FIG. 1. Furthermore, some embodiments apply the principle to dynamically vary the utilization of the communication network by the service. This is a form of latency control is also termed latency management, and provides accommodation of latency variations of the communication network.

Figure 3:
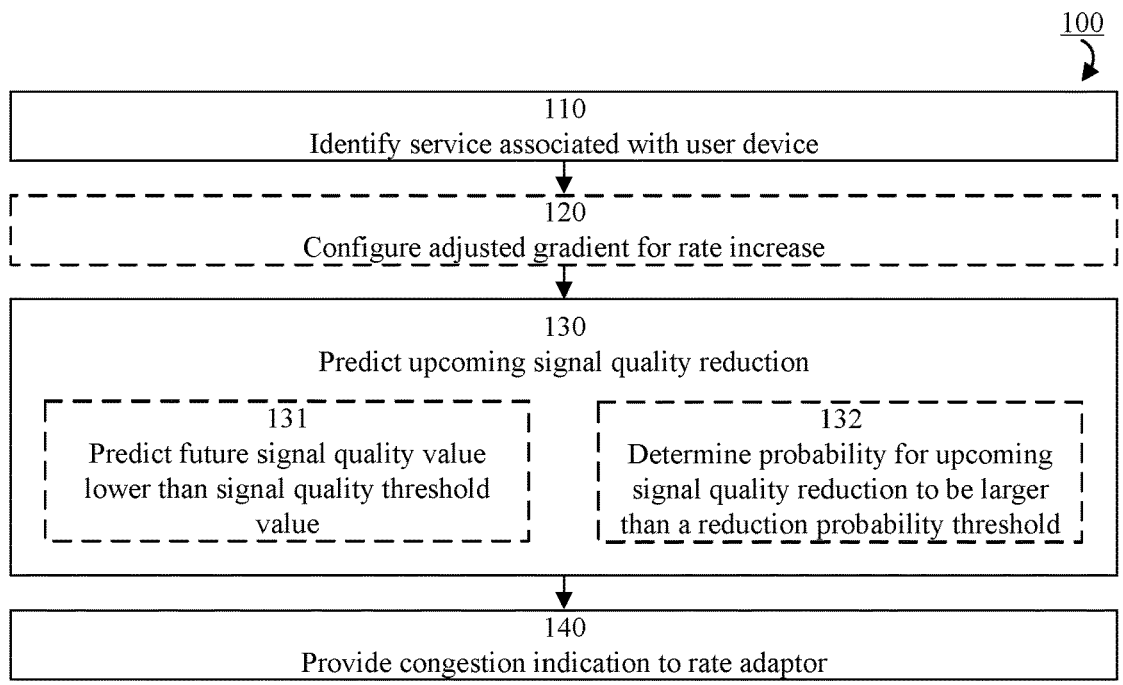
FIG. 3 is a flowchart illustrating example method steps according to some embodiments.

FIG. 3 illustrates an example method 100 according to some embodiments. The method is for latency control in a communication network (compare with communication networks 20 of FIGS. 1 and 20' of FIG. 2). The latency control may take the form of accommodation of latency variations of the communication network. The communication network is typically configured to serve a plurality of users (compare with 30a, 30b, 30c of FIG. 2).

Generally, latency control may refer to one or more of: mitigation of latency spikes, reduction/decrease of latency variance/variation associated with the communication network for the user device, reduction/decrease of average latency associated with the communication network for the user device, reduction/decrease of the probability for (i.e., number—e.g., per time unit—of) latency events associated with the communication network for the user device that exceed a latency threshold value, reduction/decrease of a maximum latency associated with the communication network for the user device, or any other suitable change in latency behavior.

A user device may, for example, comprise one of the communication end points 30, 40 of FIG. 1, one of the user devices 30a, 30b, 30c of FIG. 2, a user equipment (UE), a station (STA), or similar.

Also generally, latency control may be for mitigation of latency variations and/or for providing predictable latency and/or for providing reliable communication.

In typical embodiments, the latency control is performed under a throughput condition (e.g., that throughput should be kept at, or above, a minimum acceptable throughput).

In step 110, it is identified that a service is currently associated with a user device—the user device in turn being associated with (e.g., served by) the communication network—wherein the service has bounded deviation between a latency requirement of the service and an internal latency performance of the communication network.

That a service is associated with a user device may, for example, include that part of a service application (e.g., an application client) is running on the user device.

The service is the type of service elaborated on above-a service which relates to the communication network such that the latency requirements enforced by the service on the communication between the end points are not impossible, but not easy either, to accommodate by the internal latency performance of the communication network. This type of service is also referred to herein as latency sensitive services. This type of relationship between the service and the communication network is referred to herein by specifying that the deviation between a latency requirement of the service and an internal latency performance of the communication network is bounded.

One example that substantiates the bounded deviation between the latency requirement of the service and the internal latency performance of the communication network is that a ratio between a latency requirement parameter value of the service and an internal latency performance parameter value of the communication network falls within a bounding range. The bounding range may have any suitable value and/or may be dynamic or static.

Alternatively or additionally, one example that substantiates the bounded deviation between the latency requirement of the service and the internal latency performance of the communication network is that a latency requirement parameter value of the service and an internal latency performance parameter value of the communication network are in a same order of magnitude. For example, the same order of magnitude may be defined as not deviating more than a factor, e.g., 2, 5, or 10.

Alternatively or additionally, one example that substantiates the bounded deviation between the latency requirement of the service and the internal latency performance of the communication network is that a latency requirement parameter value of the service and an internal latency performance parameter value of the communication network are equal.

Alternatively or additionally, one example that substantiates the bounded deviation between the latency requirement of the service and the internal latency performance of the communication network is that a required end-to-end round-trip-time of the service falls within a time range specified relative an internal round-trip-time of the communication network.

The latency requirement parameter may, for example, refer to one or more of: latency variation, latency average, probability for latencies above a threshold value, maximum latency, or any other suitable latency metric. The internal latency performance parameter may, for example, be a corresponding parameter of the communication network (i.e., latency variation, latency average, probability for latencies above a threshold value, maximum latency, or any other suitable latency metric).

For 3GPP-based communication networks, the service might, for example, be a service which has a maximum allowable latency which is lower than that of mobile broadband (MBB) services and/or higher than that of ultra-reliable low latency communication (URLLC) services; or correspondingly for any other suitable latency requirement parameter.

The identification in step 110, that a service with bounded deviation between the latency requirement of the service and the internal latency performance of the communication network is currently associated with a user device, may be performed in any suitable way. Some illustrative examples include detecting that a service class identifier is indicative of the service, detecting that a bearer dedicated for low latency requirements is assigned for the service, detecting that single network slice selection assistance information (S-NSSAI) is indicative of the service, and/or determining that a traffic pattern of the service matches a latency sensitive traffic pattern.

In step 130, an upcoming reduction of communication network throughput for the user device is predicted and, in step 140, a rate adaptor associated with the service is provided with a feedback indication in response to predicting the upcoming reduction of communication network throughput, wherein the feedback indication is for rate reduction of the service. Thereby, latency control may be achieved by accommodation of latency variations of the communication network.

In some embodiments, the prediction and provision are performed only for user devices associated with services with bounded deviation between the latency requirement of the service and the internal latency performance of the communication network. Thus, the provision may be applied in a differentiated fashion, whereby user devices associated with a service of this type are subject to the feedback indication responsive to prediction of communication network throughput reduction while other user devices are not. Hence, the other user devices may apply default rate adaption.

Generally, a communication network throughput reduction may refer to corresponding change in any suitable metric(s) related to communication network throughput. Some illustrative examples include a reduction in received signal quality, a reduction in received signal strength, a reduction in received signal strength indicator (RSSI), a reduction in reference signal received power (RSRP), a reduction in reference signal received quality (RSRQ), and a reduction in signal-to-interference ratio (SIR). Typically, the metric(s) related to communication network throughput is as measured by the user device on received signals. The change may be in terms of a relative metric (e.g., SIR) and/or in terms of an absolute metric (e.g., RSSI). For example, predicting the upcoming reduction of communication network throughput for the user device may comprise predicting that a future throughput is lower than a throughput of the latency sensitive service.

In a typical example, step 140 causes switching from a first rate to a second rate, wherein the first rate is higher than the second rate. The rate decrease may be faster than if a default rate adaptation would have been applied.

Generally, the feedback indication of step 140 may be equal for different (e.g., all) types of reductions of communication network throughput of the user device, and/or may be different for different types of reductions of communication network throughput of the user device (e.g., depending on the expected duration of the reduced communication network throughput), and/or may be provided only for some types of reductions of communication network throughput of the user device. The type of reduction of communication network throughput may, for example, depend on one or more of: a current communication network throughput value at the time of prediction, a previous communication network throughput value at the time of prediction, a predicted communication network throughput value, an estimated time to the predicted communication network throughput value at the time of prediction, a length of the prediction time window, a difference between a current communication network throughput value at the time of prediction and a predicted communication network throughput value, etc.

Generally, a rate adaptor may be defined as a service functionality configured to adapt a communication rate of the service based on an input (e.g., the feedback indication) that is indicative of communication network throughput of the user device (e.g., in terms of the (current) rate capability of the transport channel used for the service traffic). The feedback indication may, for example, be a congestion indication.

The rate capability of the transport channel may be derived from any suitable metric associated with the transport channel (e.g., signal strength, received signal strength indicator (RSSI), reference signal received power (RSRP), signal quality, reference signal received quality (RSRQ), signal-to-interference ratio (SIR), bit rate, throughput, latency, etc.). Metric(s) related to rate capability of the transport channel and/or other suitable measures may, for example, be as measured by the user device on received signals.

The rate adaptor may be seen as part of a solution where rate adaption is handled on the service/application level; based on applications implemented at both communication end points (e.g., server and client), with the radio interface in between, performing congestion detection. Congestions may occur due to fading and/or cell handover, for example. A fading dip typically results in a throughput reduction in the data flow, which may lead to a congestion (i.e., queue build-up in the RAN network).

The congestion detection of a rate adaptor may be based on latency variations in the data flow, as experienced by the end points. Alternatively or additionally, some rate adaptors involve the radio access network (RAN) system, and base congestion detection on latency measurements of the data flow within the RAN system. The latter typically enables faster adaptation, i.e., the time to react on congestion is reduced when the RAN system is involved in congestion detection compared to approaches where the RAN system is not involved in congestion detection. In any case, rate adaption generally respond to ongoing congestions. Some embodiments suggest to indicate congestion proactively—in advance of the congestion—to make it possible for the application rate adaptor to lower the communication data rate earlier (e.g., before a congestion has started) and thereby reduce latency peaks that are harmful for the E2E experience. This approach may be used alone, or together with rate adaption approaches that respond to ongoing congestions.

Thus, the rate adaptor may be seen as contributing to end-to-end (E2E) congestion control and active queue management (AQM). E2E congestion control typically enables all nodes involved in the E2E communication to indicate congestion to the source. The indication may be explicit (e.g., by signaling of a feedback indication) or implicit (e.g., by dropping packets, which is detected by the source). Based on the congestion indication(s), the source may adapt its communication rate to the weakest link of the E2E communication.

Active queue management is often used in combination with E2E congestion control to reduce latency jitter (e.g., for long-lived transfers caused by burst-generating sources).

One example of E2E congestion control and AQM is low latency low loss scalable throughput (L4S). L4S uses explicit congestion indication signaling together with an active queue management algorithm. Any transport node may inform an L4S-enabled application source about queue build up using explicit congestion notification (ECN) bits in the Internet protocol (IP) header of communicator packets (e.g., signaling congestion encountered, CE). Based on congestion indications from any involved transport node, the application source may adapt its data communication rate to keep queue delays and/or E2E latency at a relatively low level.

Thus, L4S enable real-time critical data applications adapt their communication rate to the weakest link; providing as little latency impact as possible due to queue build up. For radio communication networks rate variations may occur frequently, which can lead to sudden latency peaks in prior art solutions; even when L4S or other rate adaptation is used.

Therefore, some embodiments suggest to indicate congestion proactively—in advance of congestion—to make it possible for the application to lower its throughput and thereby reduce latency peaks that are harmful for the E2E experience.

Hence, in some embodiments, the rate adaptor applies a low latency low loss scalable throughput (L4S) algorithm. In such embodiments, providing the feedback indication may comprise setting explicit congestion notification (ECN) bits.

As illustrated by optional step 120, the method may also comprise configuring the rate adaptor to apply an adjusted gradient for rate increase, which is larger than a default gradient for rate increase (i.e., the adjusted gradient is steeper than the default gradient; rate increase is faster than usual), after a period with decreased rate caused by the feedback indication. Typically, but not necessarily, the configuration of step 120 may be performed in association with step 110—and not for every feedback indication associated with steps 130 and 140.

Providing the rate adaptor with the feedback indication and/or configuring the rate adaptor to apply the adjusted gradient may comprise and/or entail transmitting one or more messages to the user device, wherein the one or more messages are indicative of the feedback indication (or corresponding rate adjustment) and/or the adjusted gradient (or corresponding rate adjustment).

In some embodiments, step 130 may include predicting that a future communication network throughput value for the user device is lower than a rate of the service, or lower than a value depending on a rate of the service.

In some embodiments, step 130 may include predicting that a future communication network throughput value for the user device is lower than a current communication network throughput value for the user device. For example, step 130 may include predicting that a future communication network throughput value for the user device is lower than a throughput threshold value (as illustrated by optional sub-step 131). The throughput threshold value may be static or dynamic. For example, the throughput threshold value may depend on the rate of the service.

The prediction of an upcoming reduction of communication network throughput in step 130 may comprise determining that a reduction of communication network throughput has already commenced for the user device and/or determining that a probability for future reduction of communication network throughput for the user device is above a reduction probability threshold value (as illustrated by optional sub-step 132). The reduction probability threshold value may be static or dynamic and may take any suitable value in the interval from zero to one.

Alternatively or additionally, the prediction of an upcoming reduction of communication network throughput in step 130 may comprise predicting the upcoming reduction of communication network throughput in an upcoming time window. Thus, step 130 may comprise determining that a reduction of communication network throughput will, or may (with some probability), take place for the user device within the time window.

The time window may be defined through one or more parameters, such as, for example, one or more of a start time, and end time, and a duration (i.e., length). The time window may be statically defined or may have varying parameters. Generally, the start time may be the time when the prediction is made, or a later point in time. Also generally, the end time and/or the duration of the time window may be seen as representing an indication of how far into the future predictions need to be made.

Alternatively or additionally, the duration of the time window may be based on how opportunistic/conservative the rate adaption should be (e.g., in terms of exploiting the maximum bitrate at any given time).

The start time of the upcoming time window and/or the length of the upcoming time window may be based on one or more of: an expected duration of the communication network throughput reduction, a maximum acceptable latency of the latency sensitive service, and a reaction speed of the rate adaptor.

For example, when the duration of the reduced communication network throughput is expected to be relatively long, the duration of the time window may be increased.

Alternatively, the duration of the time window may be set to accommodate a worst case reduced communication network throughput duration.

Alternatively or additionally, when the reaction speed of the rate adaptor is relatively slow (e.g., gradient for rate decrease has a low absolute value), the duration of the time window may be relatively large.

Alternatively or additionally, when the maximum acceptable latency of the latency sensitive service is relatively small, the duration of the time window may be relatively large.

The time window may be seen as a definition of how far into the future predictions are needed. If large latency margins are required/desired, the duration of the time window should typically be relatively long.

Generally, the prediction of an upcoming reduction of communication network throughput in step 130 may be based on cell-specific prediction criteria and/or on network-general prediction criteria.

In some embodiments, the prediction of an upcoming reduction of communication network throughput in step 130 is based on communication network throughput statistics. Communication network throughput statistics (e.g., statistics of communication network throughput reductions) may be collected, maintained, and updated over time. Each occurrence of communication network throughput reduction may be related to certain values of one or more parameters, and the statistics may comprise associations between the occurrences of communication network throughput reduction and corresponding parameter values. Based on such associations, the probability of communication network throughput reduction for a parameter setting of a current communication situation may be derived, and such probability may be used for the prediction step 130.

Derivation of the probability of communication network throughput reduction for a parameter setting may be accomplished in any suitable way. For example, a machine learning algorithm may use the statistics to derive the probability. For example, the machine learning algorithm may apply self-training based on the statistics. Alternatively or additionally, the machine learning algorithm may be trained based on initial training data or other training data related to the probability of communication network throughput reduction.

Generally, training entities may be implemented in a radio base station serving the user device or in another node (e.g., on a dedicated system outside the radio base station).

Some example parameters that may be related to an occurrence of communication network throughput reduction include user device characteristics (e.g., capability category, UE category, subscription type, vendor, brand, original equipment manufacturer-OEM, etc.), a current time indication (e.g., indicating one or more of: time of day, day or week, date, season, etc.), current and/or previous location of the user device, current and/or previous signal quality of the user device, current and/or previous communication network throughput of the user device, current and/or previous timing advance (TA) of the user device, and load of serving cell and/or target cell.

As a typical example of the prediction of step 130, the statistics may indicate that a user device at a certain location has a corresponding probability of communication network throughput reduction within an upcoming time window. Alternatively or additionally, the statistics may indicate that a user device moving towards a certain location (e.g., from a specific direction) has a corresponding probability of communication network throughput reduction within an upcoming time window. Alternatively or additionally, the statistics may indicate that a user device moving with a certain speed has a corresponding probability of communication network throughput reduction within an upcoming time window. Alternatively or additionally, the statistics may indicate that a user device with a certain current communication network throughput drop has a corresponding probability of communication network throughput reduction within an upcoming time window. Alternatively or additionally, the statistics may indicate that a user device in a cell with certain load has a corresponding probability of communication network throughput reduction within an upcoming time window.

In conclusion, FIG. 3 has demonstrated that latency variations of a communication network may be accommodated by proactive congestion indication based on predicted reduction of communication network throughput.

Various embodiments may be implemented entirely or partly in a network node such as a radio base station. Alternatively or additionally, various embodiments may be fully or partly implemented in a virtual environment and/or in a cloud environment. For example, training may be performed in a cloud environment and fed back to a radio base station that causes the rate adaption, and/or cloud-based services may be used for storing.

Figure 4:
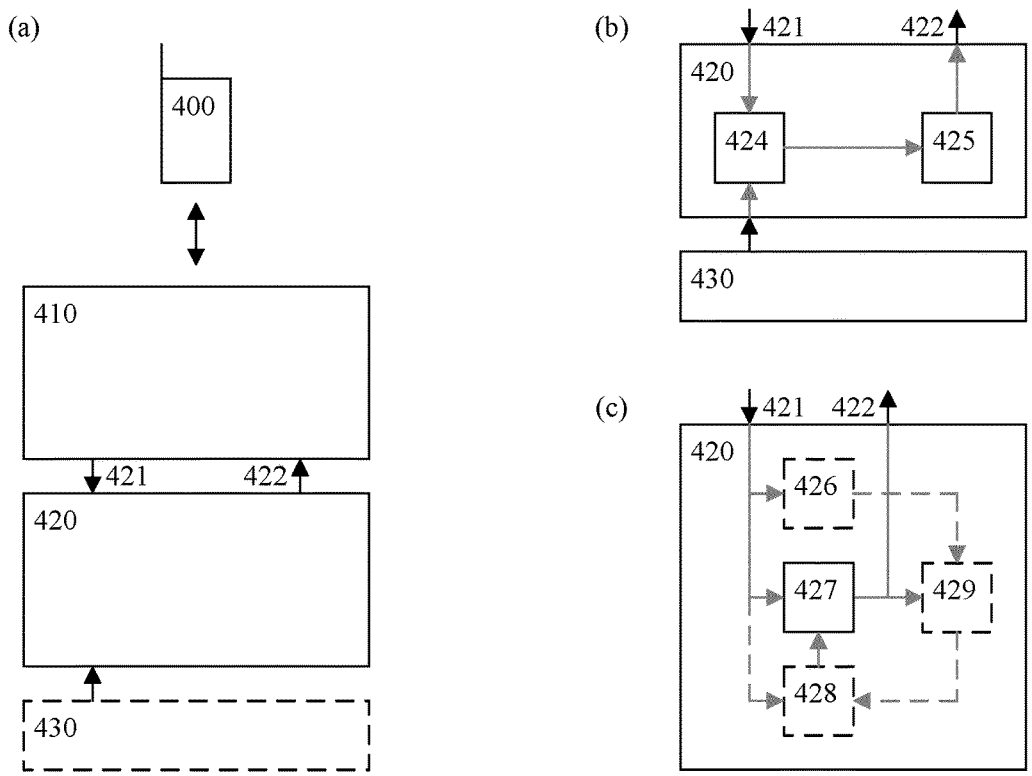
FIG. 4 is a schematic drawing illustrating example principles according to some embodiments.

FIG. 4 schematically illustrates some example principles according to some embodiments.

Part (a) of FIG. 4 shows a user device (e.g., a UE) 400 associated with a latency sensitive service, a radio base station 410, and a communication network throughput reduction prediction algorithm 420. For example, the communication network throughput reduction prediction algorithm 420 may be trained based on one or more optimization targets 430 (e.g., accuracy of throughput prediction during reduction). When the communication network throughput reduction prediction algorithm 420 predicts an upcoming reduction of communication network throughput for the user device 400 based on observations 421 at the base station 410, the base station 410 may be instructed 422 to indicate congestion proactively (e.g., by use of ECN bits for L4S-based rate adaption).

Part (b) of FIG. 4 illustrates example training of the communication network throughput reduction prediction algorithm 420 using reinforcement learning and one or more optimization targets 430.

An interpreter 424 receives observations 421 (parameter setting; e.g., network conditions and/or performance metrics) for the user device. The interpreter 424 informs an agent 425 about a current state based on the observations and provides the agent with a corresponding reward for decisions taken by the agent based on the optimization target 430.

Over time, the agent learns about patterns that improve the service quality for a current state (i.e., patterns of communication network throughput reduction occurrence in relation to observations). Thus, based on state and rewards, the agent may learn to recognize/predict that a communication network throughput reduction will happen in the near future. Consequently, the base station can be instructed 422 to indicate congestion proactively.

Part (c) of FIG. 4 illustrates example training of the communication network throughput reduction prediction algorithm 420 using one or more optimization targets 430 and supervised learning of a neural network 427. During training, observations 421 are input to the neural network 427, as well as to a classification module 426 and a training algorithm 428. Based on the observations and a previous error, the training algorithm 428 provides weights to the neural network 427. The output of the neural network is compared, in an error calculator 429, with a desired output provided by the classification module 426, and the error is provided to the training algorithm. The training may be iterated until a convergence is achieved.

During prediction, observations 421 are input to the neural network 427, the output of which can be used to instruct 422 the base station to indicate congestion proactively.

Figure 5:
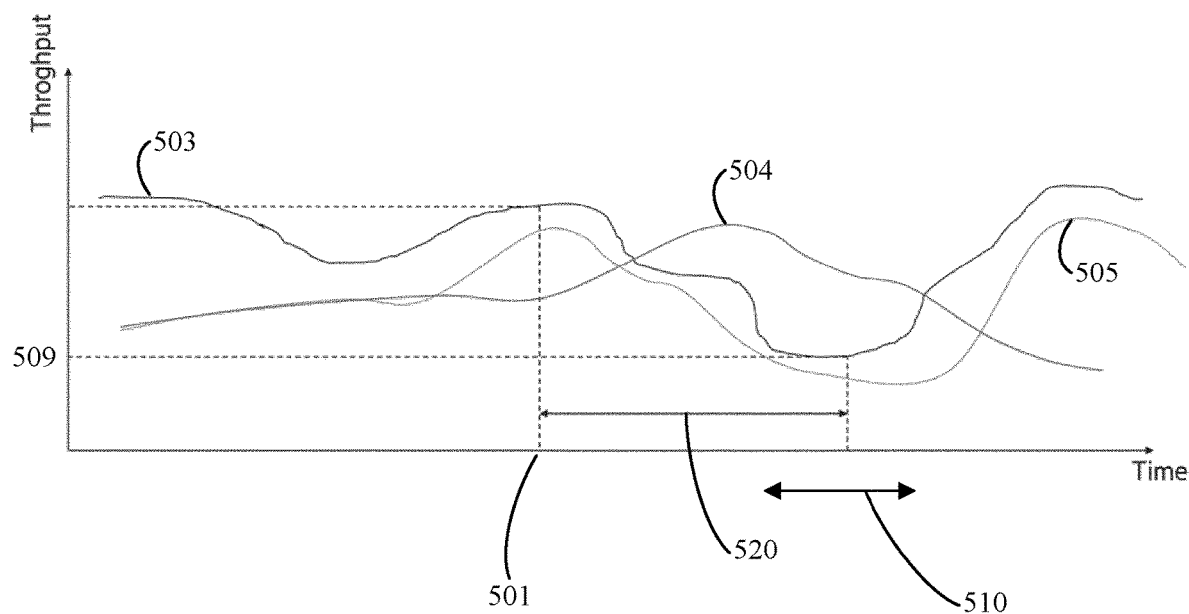
FIG. 5 is a plot diagram illustrating example principles according to some embodiments.

FIG. 5 illustrates example principles according to some embodiments. In FIG. 5, a scenario is depicted using throughput as a function of time. In the throughput plot, available bitrate is indicated as 503. When a communication network throughput reduction is caused, the available bitrate decreases for the user device, as illustrated by duration 510.

When a latency sensitive service is associated with the user device, this communication network throughput reduction may negatively impact the end-to-end experience of the service. Applying embodiments of the invention, a rate adaptor associated with the service is provided with a feedback indication for rate reduction of the service, responsive to a prediction of the communication network throughput reduction (e.g., at time 501, predicting communication network throughput reduction within a time window 520). Thereby, feedback indication for the upcoming congestion due to communication network throughput reduction is provided in advance of the communication network throughput reduction 510.

Generally, prediction of a communication network throughput reduction may comprise one or more of: prediction of a communication network throughput value 509, prediction of a communication network throughput being below a threshold value, prediction of decreasing communication network throughput, etc.

If feedback indication for the upcoming congestion was not provided in advance, the rate adaptor would instead be made aware of the congestion during the communication network throughput reduction 510. This scenario is illustrated by application bitrate curve 504. The application rate is lowered during the communication network throughput reduction 510 (e.g., due to lack of feedback from the application client). However, without proactive congestion indication the application will continue to produce bits during at least the initial part of the communication network throughput reduction, which leads to queue build-up during the communication network throughput reduction, in turn resulting in latency peaks with potentially severe application impact.

On the other hand, application of embodiments presented herein entails that the early rate adaption causes latency to increase less during the communication network throughput reduction 510. This is illustrated by application bitrate curve 505. It can be seen that the application bit rate 505 is kept below the available bit rate 503 in this case; also during the communication network throughput reduction 510. The rate adaptor may also be configured to apply a steeper (more aggressive) rate increase after the communication network throughput reduction 510.

Figure 6:
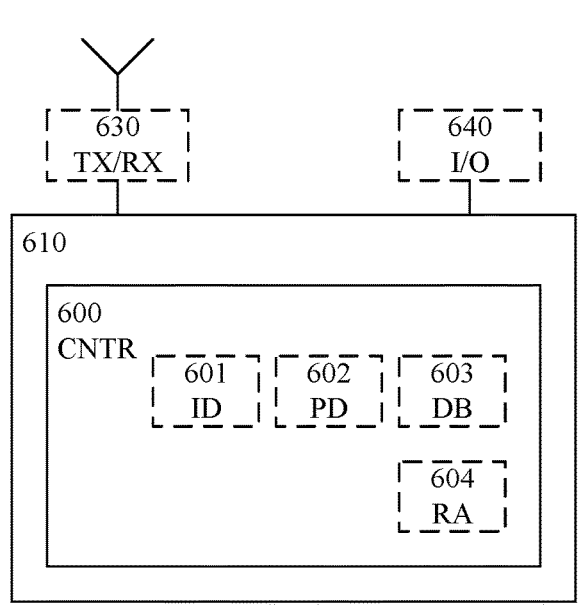
FIG. 6 is a schematic block diagram illustrating an example apparatus according to some embodiments.

FIG. 6 schematically illustrates an example apparatus 610 for latency control in a communication network according to some embodiments. The apparatus 610 may, for example, be comprisable (e.g., comprised) in a network node (e.g., a radio access node such as a base station, or a central processing node). Alternatively or additionally, the apparatus 610 may be configured to cause execution of one or more of the method steps described herein (e.g., in connection with the method 100 of FIG. 3). The apparatus comprises a controller (CNTR; e.g., controlling circuitry or a control module) 600.

The controller 600 is configured to cause identification that a service is currently associated with a user device associated with the communication network, with bounded deviation between a latency requirement of the service and an internal latency performance of the communication network (compare with step 110 of FIG. 3).

To this end, the controller 600 may comprise or be otherwise associated with (e.g., connectable, or connected, to) an identifier (ID; e.g., identifying circuitry or an identification module) 601. The identifier may be configured to identify that a service is currently associated with a user device associated with the communication network, with bounded deviation between a latency requirement of the service and an internal latency performance of the communication network.

The controller 600 is also configured to cause prediction of an upcoming reduction of communication network throughput for the user device (compare with step 130 of FIG. 3).

To this end, the controller 600 may comprise or be otherwise associated with (e.g., connectable, or connected, to) a predictor (PD; e.g., predicting circuitry or a prediction module) 602. The predictor may be configured to predict the upcoming reduction of communication network throughput for the user device using any suitable approach.

The prediction of the upcoming communication network throughput reduction for the user device may be based on communication network throughput statistics as explained above in connection to FIG. 3.

To this end, the controller 600 may comprise or be otherwise associated with (e.g., connectable, or connected, to) a statistics database.

The database may be co-located with the controller as illustrated by the database (DB) 603 of FIG. 6. Alternatively or additionally (e.g., for a distributed database), the database may be located apart from the controller 600, but accessible by the controller, e.g., via an apparatus interface (I/O) 640.

The predictor may be configured to predict the upcoming reduction of communication network throughput for the user device using any communication network throughput statistics (e.g., based on machine-learning, or other analysis of communication network throughput statistics).

The controller 600 is also configured to cause provision to a rate adaptor associated with the service of a feedback indication in response to predicting the upcoming reduction of communication network throughput, wherein the feedback indication is for rate reduction (compare with step 140 of FIG. 3). The controlling circuitry may be further configured to cause configuration of the rate adaptor to apply an adjusted gradient for rate increase which is larger than a default gradient for rate increase (compare with step 120 of FIG. 3).

The rate adaptor may be co-located with the controller as illustrated by the rate adaptor (RA) 604 of FIG. 6. Alternatively or additionally, the rate adaptor may be located apart from the controller 600, but accessible by the controller, e.g., via an apparatus interface (I/O) 640.

Provision to the rate adaptor of feedback indication and/or configuration of the rate adaptor to apply the adjusted gradient may comprise and/or entail transmission of one or more messages to the user device, wherein the one or more messages are indicative of the feedback indication (or corresponding rate adjustment) and/or the adjusted gradient (or corresponding rate adjustment).

To this end, the controller 600 may comprise or be otherwise associated with (e.g., connectable, or connected, to) a transmitter (TX; e.g., transmitting circuitry or a transmission module) 630 and/or an apparatus interface (I/O; e.g., interface circuitry or an interface module) 640. The transmitter may be configured to transmit message(s) to the user device (e.g., when the apparatus is comprisable in a radio access node). The interface may be configured to transfer message(s) to a radio access node for transmission to the user device (e.g., when the apparatus is comprisable in a central processing node).

In some embodiments, the controlling circuitry may be configured to cause prediction and provision only for user devices associated with services with bounded deviation between the latency requirement of the service and the internal latency performance of the communication network.

The described embodiments and their equivalents may be realized in software or hardware or a combination thereof.

The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a network node.

Embodiments may appear within an electronic apparatus (such as a network node) comprising arrangements, circuitry, and/or logic according to any of the embodiments described herein. Alternatively or additionally, an electronic apparatus (such as a network node) may be configured to perform methods according to any of the embodiments described herein.

Figure 7:
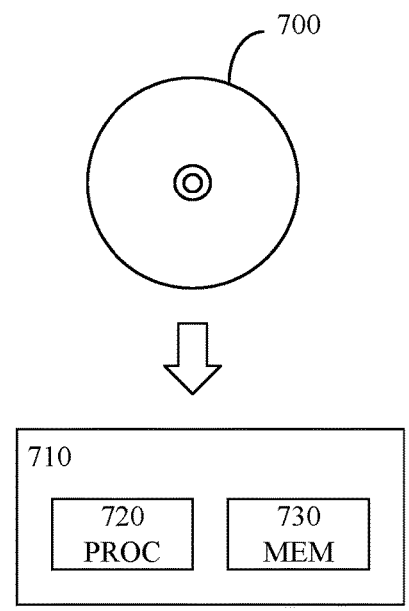
FIG. 7 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 7 illustrates an example computer readable medium in the form of a compact disc (CD) ROM 700. The computer readable medium has stored thereon a computer program comprising program instructions. The computer program is loadable into a data processor (PROC; e.g., data processing circuitry or a data processing unit) 720, which may, for example, be comprised in a network node 710. When loaded into the data processor, the computer program may be stored in a memory (MEM) 730 associated with or comprised in the data processor. According to some embodiments, the computer program may, when loaded into and run by the data processor, cause execution of method steps according to, for example, any of the methods as illustrated in FIG. 3 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for accommodation of latency variation in a communication network, the method comprising:
   identifying that a service is currently associated with a user device associated with the communication network, wherein a deviation between a latency requirement of the service and an internal latency performance of the communication network is bounded;
   predicting an upcoming reduction of communication network throughput for the user device, wherein predicting the upcoming reduction of the communication network throughput includes determining that a probability for upcoming communication network throughput reduction for the user device is larger than a reduction probability threshold value; and
   providing a rate adaptor associated with the service with a feedback indication in response to predicting the reduction of communication network throughput, wherein the feedback indication is for rate reduction of the service.

2. The method of claim 1, wherein the prediction and provision are performed only for user devices associated with services with bounded deviation between the latency requirement of the service and the internal latency performance of the communication network.

3. The method of claim 1, wherein predicting the upcoming reduction of communication network throughput for the user device comprises predicting that a future communication network throughput value for the user device is lower than a throughput threshold value.

4. The method of claim 1, wherein predicting the upcoming reduction of communication network throughput for the user device comprises predicting the upcoming reduction of communication network throughput in an upcoming time window.

5. The method of claim 4, wherein a start time of the upcoming time window and/or a length of the upcoming time window is based on one or more of: an expected duration of the reduction of communication network throughput, a maximum acceptable latency of the latency sensitive service, and a reaction speed of the rate adaptor.

6. The method of claim 1, further comprising configuring the rate adaptor to apply an adjusted gradient for rate increase which is larger than a default gradient for rate increase.

7. The method of claim 6, wherein the rate adaptor is configured to apply the adjusted gradient for rate increase after a period with decreased rate caused by the feedback indication.

8. The method of claim 1, wherein the rate adaptor applies a low latency low loss scalable throughput, L4S, algorithm, and wherein providing the feedback indication comprises setting explicit congestion notification, ECN, bits.

9. The method of claim 1, wherein predicting the upcoming reduction of communication network throughput for the user device is based on one or more cell-specific prediction criteria and/or on one or more network-general prediction criteria.

10. The method of claim 1, wherein predicting the upcoming reduction of communication network throughput for the user device is based on one or more of:
- a capability category of the user device;
- a subscription type of the user device;
- an original equipment manufacturer, OEM, of the user device;
- a current time indication;
- a current and/or previous location of the user device;
- a current and/or previous signal quality of the user device;
- a current and/or previous communication network throughput of the user device;
- a current and/or previous timing advance, TA, of the user device; and
- a load of a serving cell and/or a target cell.

11. The method of claim 1, wherein predicting the upcoming reduction of communication network throughput for the user device is based on communication network throughput statistics.

12. The method of claim 1, wherein identifying that a service is currently associated with a user device, wherein the deviation between the latency requirement of the service and the internal latency performance of the communication network is bounded, comprises one or more of:
- detecting that a service class identifier is indicative of the service;
- detecting that a bearer dedicated for low latency requirements is assigned for the service; and
- determining that a traffic pattern of the service matches a latency sensitive traffic pattern.

13. The method of claim 1, wherein the bounded deviation between the latency requirement of the service and the internal latency performance of the communication network comprises one or more of:
- a ratio between a latency requirement parameter value of the service and an internal latency performance parameter value of the communication network not exceeding a bounding threshold;
- a latency requirement parameter value of the service and an internal latency performance parameter value of the communication network being in a same order of magnitude;
- a latency requirement parameter value of the service and an internal latency performance parameter value of the communication network being equal; and
- a required end-to-end round-trip-time of the service falling within a time range specified relative an internal round-trip-time of the communication network.

14. The method of claim 1, wherein the service has a maximum allowable latency which is lower than that of mobile broadband, MBB, services and/or higher than that of ultra-reliable low latency communication, URLLC, services.

15. A computer program product comprising a non-transitory computer readable medium, having thereon a computer program comprising program instructions, the computer program being loadable into a data processing unit and configured to cause execution of the method according to claim 1 when the computer program is run by the data processing unit.

16. An apparatus for accommodation of latency variation in a communication network, the apparatus comprising controlling circuitry configured to cause:
- identification that a service is currently associated with a user device associated with the communication network, wherein a deviation between a latency requirement of the service and an internal latency performance of the communication network is bounded;
- prediction of an upcoming reduction of communication network throughput for the user device, wherein predicting the upcoming reduction of the communication network throughput includes determining that a probability for upcoming communication network throughput reduction for the user device is larger than a reduction probability threshold value; and
- provision to a rate adaptor associated with the service of a feedback indication in response to predicting the upcoming reduction of communication network throughput, wherein the feedback indication is for rate reduction of the service.

17. The apparatus of claim 16, wherein the controlling circuitry is configured to cause prediction and provision to be performed only for user devices associated with services with bounded deviation between the latency requirement of the service and the internal latency performance of the communication network.

18. The apparatus of claim 16, wherein the controlling circuitry is configured to cause prediction of the upcoming reduction of communication network throughput for the user device by causing prediction that a future communication network throughput value for the user device is lower than a throughput threshold value.

19. The apparatus of claim 16, wherein the controlling circuitry is configured to cause prediction of the upcoming reduction of communication network throughput for the user device by causing determination that a probability for upcoming reduction of communication network throughput for the user device is larger than a reduction probability threshold value.

* * * * *